United States Patent [19]
Cadeddu

[11] Patent Number: 4,514,985
[45] Date of Patent: May 7, 1985

[54] MASTER CYLINDER

[75] Inventor: Leonardo Cadeddu, Crema, Italy

[73] Assignee: Benditalia S.p.A., Crema, Italy

[21] Appl. No.: 661,261

[22] Filed: Oct. 15, 1984

Related U.S. Application Data

[63] Continuation of Ser. No. 411,389, Aug. 25, 1982, abandoned, and Ser. No. 225,229, Jan. 14, 1981, abandoned.

[30] Foreign Application Priority Data

Jan. 17, 1980 [IT] Italy ............... 19270 A/80

[51] Int. Cl.³ ............................. B60T 11/28
[52] U.S. Cl. ....................................... 60/589
[58] Field of Search .............. 60/585, 589; 137/853, 137/860; 251/210; 277/205

[56] References Cited

U.S. PATENT DOCUMENTS

| | | | |
|---|---|---|---|
| 2,561,009 | 7/1951 | Byers | 60/589 |
| 3,165,896 | 1/1965 | Baldwin . | |
| 3,264,006 | 8/1966 | Downs | 137/860 |
| 4,099,380 | 7/1978 | Cadeddu | 60/589 |

FOREIGN PATENT DOCUMENTS

| | | | |
|---|---|---|---|
| 809032 | 7/1951 | Fed. Rep. of Germany . | |
| 2746260 | 4/1978 | Fed. Rep. of Germany | 60/589 |
| 872682 | 1/1941 | France | 60/585 |
| 137348 | 9/1952 | Sweden | 60/589 |
| 1001990 | 8/1965 | United Kingdom | 60/589 |

Primary Examiner—Abraham Hershkovitz
Attorney, Agent, or Firm—Larry J. Palguta; Ken C. Decker

[57] ABSTRACT

The master cylinder (10) comprises a seal cup (24) made from an elastomeric material assembled with axial and radial play around the head (18) of the piston (16). A stop ring (40) slidably received in the bore (14) permits to unseat the seal cup (24) from the shoulder (30) of the piston in order to connect the supply chamber (28) and the pressure chamber (26). When the piston (18) is displaced towards the latter, it displaces the stop ring (40) by the cooperation of two conical surfaces (54 and 56), the seal cup (24) being supported on a flat surface, composed of the radial shoulder (30) of the piston and the radial face 42 of the stop ring (40) substantially continuous.

1 Claim, 5 Drawing Figures

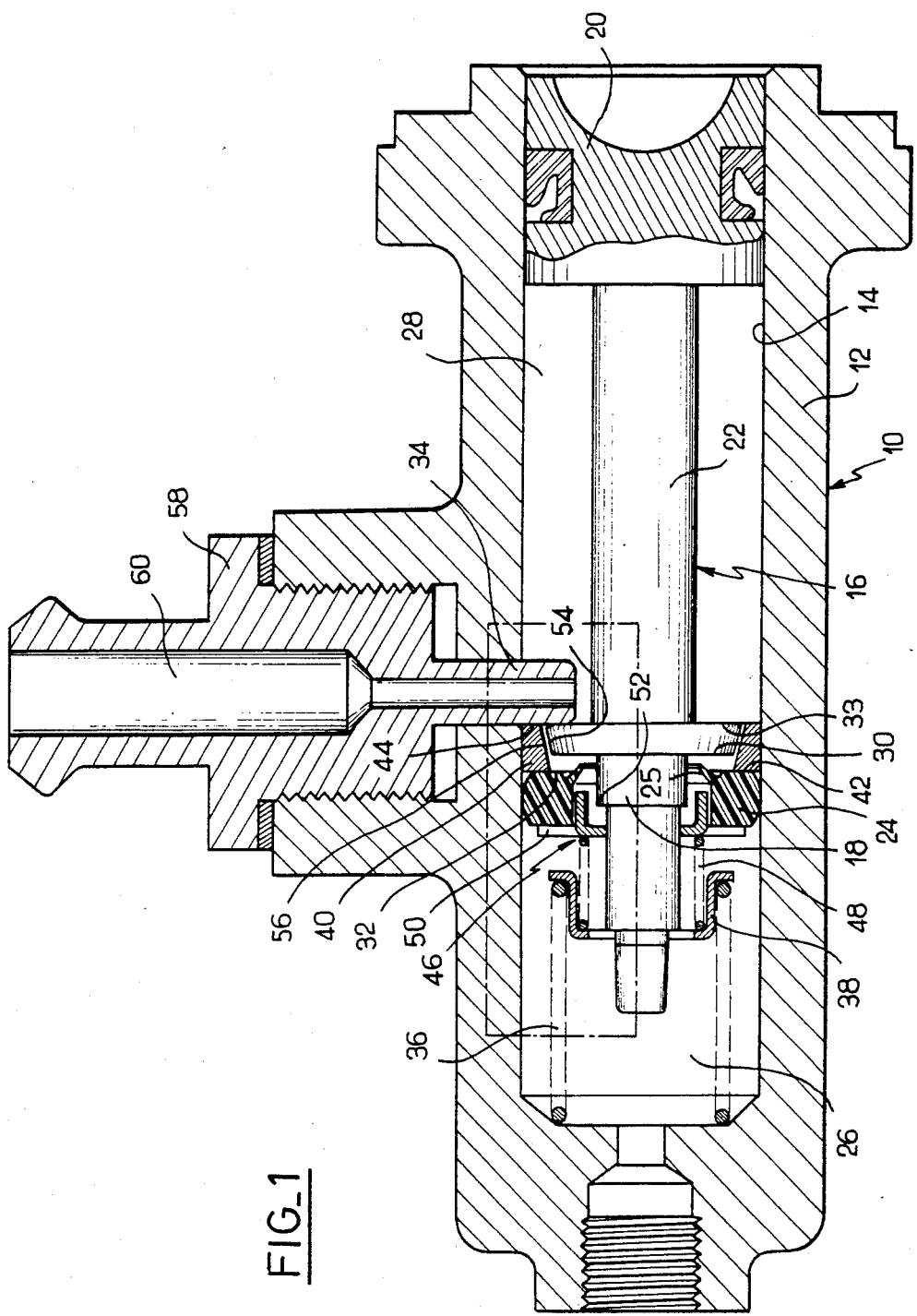
FIG_1

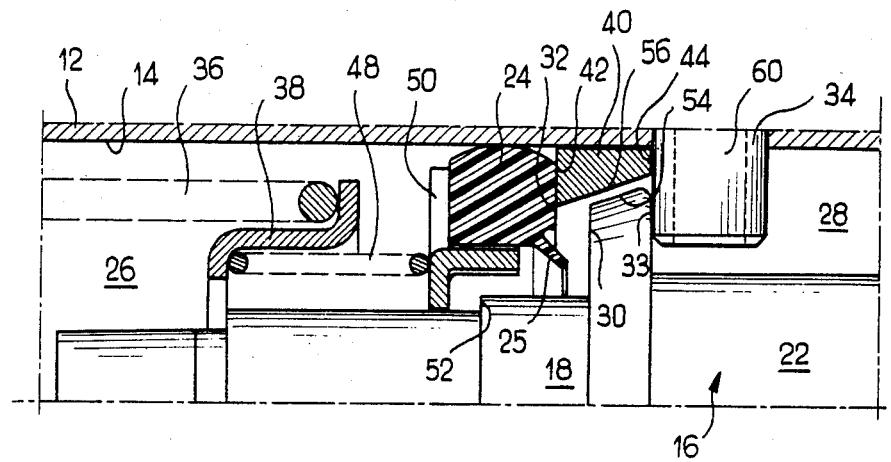
FIG_2
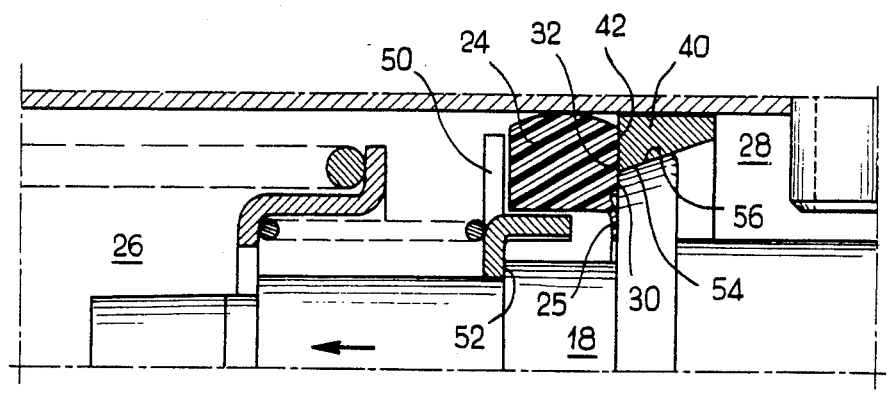
FIG_3

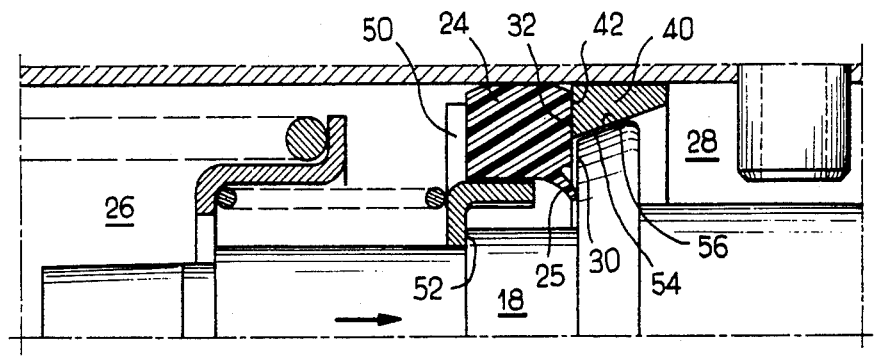
FIG_4
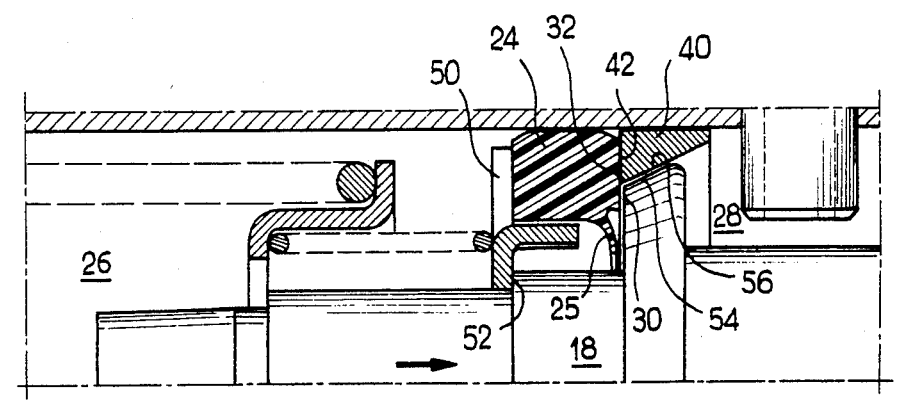
FIG_5

MASTER CYLINDER

This is a continuation of application Ser. No. 411,389, filed Aug. 25, 1982, now abandoned, and abandoned Ser. No. 225,229 filed Jan. 14, 1981.

The present invention relates to master cylinders of the type in which a seal cup made from elastomer material, assembled with axial and radial play around a piston, cooperates with a bore and with a radial shoulder of the piston, in order to control the passage of fluid from a supply chamber towards a compression chamber, a stop ring, assembled round the piston, permitting to unseat the seal cup away from the radial shoulder when the piston is resiliently returned towards its rest position to enable the flow of fluid between the two chambers through a radial space separating the piston from the stop ring.

A master cylinder of this kind is described in the Italian patent application No. 25 360 filed on Dec. 15, 1962 to which it is advantageous to refer.

It is to be noted that in this type of master cylinder, during the compression stroke of the piston, the seal cup is held both against the stop ring and against the radial shoulder of the piston and entirely masks the radial space which separates these latter elements.

It can be seen from a more thorough analysis of the behavior of the seal cup during the compression stroke of the piston that a portion of the cup is forced to penetrate a short distance into this radial space, this portion normally resuming a flat shape again when the piston is brought back to its rest position. Nevertheless, wear tests have shown that these repeated deformations result in deterioration of the stop ring. This deterioration risks being even greater because at present the braking circuits tend to operate under increasingly higher pressures, especially owing to the increasingly widespread use of disc brakes and owing to the replacement of friction materials with an asbestos base by other materials whose coefficients of friction are lower.

The main object of the present invention is hence to design a master cylinder of this kind in such a manner that the radial space which separates the piston from the stop ring has a practically zero thickness during the compression stroke of the piston, at least in the support zone of the seal cup. To this end, the present invention proposes a master cylinder of the type comprising a housing provided with a bore which slidably receives a piston, the latter comprising a head portion cooperating with a cup made from an elastomeric material, the latter sliding sealingly at its periphery in the bore, to separate in the bore a pressure chamber from a fluid supply chamber, the head of the piston having a radial shoulder which is adapted to abut sealingly against a lateral face of the elastomer cup adjacent thereto, a stop ring adapted to urge said elastomer ring away from said radial shoulder when the piston occupies its rest position, to establish a fluid communication between said two chambers, said stop ring being slidably received in said bore and driven by the piston when the latter is displaced from its rest position, characterized that the piston includes a contact surface, limited by the external edge of said radial shoulder, whose perpendiculars are tilted both with respect to the axis of the bore and with respect to the planes perpendicular to this axis and in that said ring comprises a mating contact surface.

The invention will now be described with reference to the accompanying drawings, wherein:

FIG. 1 is a partial longitudinal cross section of a master cylinder according to the invention;

FIG. 2 is an enlarged view of the portion of FIG. 1 surrounded by dotted lines;

FIG. 3 is an enlarged view similar to that of FIG. 2 showing the elements of the master cylinder during the compression stroke of the piston.

FIG. 4 is an enlarged view similar to that of FIG. 2 showing the elements of the master cylinder during the return stroke of the piston and, FIG. 5 is an enlarged view similar to that of FIG. 4 illustrating a detail of operation on return stroke of the piston.

The master cylinder shown in FIG. 1 includes a housing 12 provided with a bore 14 in which is slidably received a piston 16. The latter includes a head portion 18, a rear portion 20 of large diameter slidably and sealingly received in the bore 14 and a central portion 22 of small diameter connecting the head portion 18 and the rear portion 20. The head portion 18 is adapted to cooperate with a seal cup 24 made from elastomeric material in order to separate in the bore 14 a pressure chamber 26 adapted to be connected to a circuit supplying brake motors, which are not shown, and a supply chamber 28 adapted to be connected to a fluid reservoir, also not shown.

The head 18 comprises a frontal radial shoulder 30 which can abut sealingly against a lateral face of the elastomer cup 24. The latter slides at its periphery along the internal wall of the bore 14 and is assembled with a radial play around the head of the piston. The head 18 comprises also a rear radial shoulder 33 which is capable of engaging a stop 34, to define a rest position for the piston 16 when the latter is brought back to the right, viewing FIG. 1, by a spring 36 which rests on a cup 38 solid with the head 18. A stop ring 40 is slidably mounted in the bore 14 and around the head 18 of the piston 16; this ring 40 is provided with a radial face 42 adjacent to the elastomer ring 24 and a rear radial face 44 which is capable of engaging the stop 34 to unseat the elastomer ring 24 from the frontal radial shoulder 30 when the piston occupies its rest position, the axial thickness of the stop ring 40 being greater than the axial distance separating the front and rear radial shoulders 30 and 33 of the head 18 of the piston 16. A return device 46, consisting of a second spring 48, resting on the cup 38, and of a washer 50 adjacent to the elastomer ring 24 urges the latter towards the stop ring 40; a second frontal radial shoulder 52 of the head 18 of the piston 16, separated from the radial shoulder 30 by a distance greater than the axial thickness of the elastomer ring 24, limiting the travel of the washer 50 towards the shoulder 30. The force of the second spring 48 is lower than that of the spring 36.

The head 18 of the piston 16 is provided with a contact surface 54, limited on the one hand by the external edge of the radial shoulder 30 and on the other hand by the external edge of the rear radial shoulder 33, whose perpendiculars are tilted both with respect to the axis of the bore and with respect to the planes perpendicular to this axis, and the stop ring 40 is provided with a mating contact surface 56. In other words, the contact surfaces 54 and 56 are such that any axial displacement of one away from the other provokes the occurence of a radial play between them.

In the preferred embodiment of the invention shown in the figures, the contact surface 54 consists of a portion of a cone of revolution whose vertex is situated on the axis of the bore and on the side of the pressure chamber. The angle between the generatrices of the cone of revolution and the axis of the bore is chosen in such a manner as to avoid any locking of the stop ring 40 on the head of the piston by seizing. In the preferred embodiment shown in the figures, this angle is about 18°. In this embodiment the stop ring 40 is made from steel or brass and the piston 16 from steel.

Finally, the stop 34 forms the end of a fitting 58 fixed on the housing 12 and provided with a passage 60 which communicates the supply chamber 28 with a reservoir (not shown). Moreover, the elastomer seal cup 24 is provided with a lip 25 which acts as a non-return valve.

The operation of the master cylinder will now be described with reference to FIGS. 2–5. FIG. 2 is an enlarged view of that portion of FIG. 1 which is surrounded by dotted lines, showing the elements described previously in their rest positions, the spring 36 urging the cup 38 and the head 18 in engagement against the stop 34 and the stop ring 40 abutting on the same stop to urge the elastomer cup 24 away from the radial shoulder 30 against the spring 48.

It will be noted that in this situation, the contact surfaces 54 and 56 of the head 18 and of the stop ring 40 are spaced radially from each other and there is a free communication of fluid between the two chambers 26 and 28.

FIG. 3 shows the elements of the master cylinder 10 during a compression stroke of the piston 16, the latter being displaced in the direction of the arrow. The piston 16 drives the stop ring 40 by engagement of the contact surfaces 54 and 56, and the elastomer cup 24 seals the two chambers 26 and 28 from each other by cooperation on the one hand of its periphery with the bore 14 and on the other hand of its lateral face 32 with the radial shoulder 30 of the piston and the radial face 42 of the stop ring.

In this situation it will be noted that the radial play which exists in the rest position between the contact surfaces 54 and 56 is reduced practically to zero and that the lateral face 32 of the elastomer cup 24 rests on a flat surface, composed of the radial shoulder 30 of the piston and of the radial face 42 of the stop ring, practically continuous when considering the machining tolerances. This arrangement permits to reduce substantially the deformations of the elastomer cup.

FIG. 4 shows the elements of the master cylinder 10 during a return stroke of the piston, the latter being displaced in the direction of the arrow.

The piston 16 is returned by the spring 36 towards the stop 34. By friction against the wall of the bore 14, the elastomer cup 24 and the stop ring 40 are urged into abutment against the washer 50, the lip 25 of the elastomer cup 24 remaining in contact with the radial shoulder 30 of the piston to prevent any return of fluid from the compression chamber 26 towards the supply chamber 28 through the axial play and the radial play which then respectively separate the lateral face 32 from the radial shoulder 30 and the contact surface 54 from the contact surface 56 as shown in FIG. 4.

FIG. 5 shows the operation of the lip 25 of the elastomer ring during the return stroke of the piston.

It can happen that, under the influence of the spring 36, the piston 16 is returned to its rest position at such a speed that the pressure prevailing in the pressure chamber drops momentarily below the atmospheric pressure. The lip 25 of the elastomer cup ring is then deformed away from the radial shoulder 40 to establish a fluid flow from the supply chamber towards the pressure chamber.

When the piston has completed its return stroke, all the elements of the master cylinder return to the position illustrated in FIG. 2.

It will be noted that the drive of the stop ring by engagement of the frusto conical contact surfaces 54 and 56 permits a considerable simplification of the shape of the piston 16. In fact, in the known master cylinder described in the Italian patent application No. 25 360 already quoted, the drive of the stop ring is ensured by means of a radial shoulder of the piston adjacent to the rear surface of the stop ring. It is consequently necessary to provide a longitudinal groove along the piston to accomodate the passage of the stop. In the case of the present invention, since there is no reason for provision of such a groove, the piston consequently has a central portion of reduced diameter as shown.

It will be noted that, in this design, the guiding of the piston in the bore is ensured on the one hand by means of the rear portion 20 and on the other hand by means of the stop ring 40 which, on compression stroke of the piston, forms a guide for the latter. The machining tolerances which are selected as small as possible, make possible an "automatic centering" of the ring with respect to the piston. Owing to this, the axial dimension of the rear portion 20 can be appreciably reduced when compared to master cylinders known from the prior art.

I claim:

1. A master cylinder comprising a housing provided with a bore, a piston slidably mounted in said bore and having a head limited by a forward radially extending face and a rearward radially extending face with the latter being urged against a stop by a spring to define a rest position for the piston, a stop ring also slidably received in the bore around said piston head and also limited by radially extending forward and rearward faces, and an annular sealing cup made of elastomeric material sliding at its periphery in the bore and separating therein a pressure chamber from a fluid supply chamber, the sealing cup having a radially extending face on the side of the supply chamber and which is urged by a further spring against one of the faces of the stop ring to urge the other face of the stop ring against the stop in the rest position of the piston, the sealing cup radially extending face being engageable by the forward radially extending face of the piston head during its compression stroke, said faces on the piston head and on the stop ring being respectively separated by complementary frusto-conical surfaces whose vertex is located on the axis of the bore on the side of the pressure chamber, said frusto-conical surfaces being separated from each other in the rest position of the piston to allow fluid communication between the pressure chamber and the supply chamber and being mutually intimately engageable during the compression stroke of the piston to cause the piston to move the stop ring toward said pressure chamber with the stop ring acting as a stabilizing guide for the piston, the frusto-conical surface formed on the piston head between its two faces having a maximum axial height less than that of the complementary frusto-conical surface formed on the stop ring while their respective minimum diameters are substantially equal, so that the respective forward faces of the piston head and stop ring define a continuous coplanar radial surface engaging the entire radially extending face of the sealing cup on the supply chamber side thereof during the compression stroke, the continuous coplanar radial surface applying a substantially constant force across the radially extending face of the sealing cup during the compression stroke in order to reduce deformation and wear of the sealing cup.

* * * * *